United States Patent [19]
White

[11] 3,760,438
[45] Sept. 25, 1973

[54] SURVIVAL KNIFE

[76] Inventor: James F. White, Rt. 2, Box 182 A, Anacortes, Wash.

[22] Filed: July 14, 1971

[21] Appl. No.: 162,538

[52] U.S. Cl. .......................... 7/1 B, 30/143, 30/151
[51] Int. Cl. ........ B25f 1/00, B26b 11/00, B26b 3/06
[58] Field of Search ...................... 7/1 B, 1 H, 11 R, 7/11 A, 14.1 R; 30/123 R, 143, 151, 152

[56] References Cited
UNITED STATES PATENTS

| | | | |
|---|---|---|---|
| 2,651,106 | 9/1953 | Breitzke | 7/11 X |
| 1,176,583 | 3/1916 | McPhee | 30/151 |
| 1,268,930 | 6/1918 | Cook | 7/11 R |
| 1,370,995 | 3/1921 | Prince | 30/151 |
| 912,411 | 2/1909 | Putney | 7/14.1 R |

Primary Examiner—Othell M. Simpson
Attorney—Richard W. Seed et al.

[57] ABSTRACT

A knife blade is provided with a sharpened end and an attachment end having a spool or reel for a fishing line attached thereto. A knife handle is provided with a blade receiving compartment and a stroage compartment for carrying fishing gear. The handle may be placed on either end so that in one position the fishing reel is exposed with the sharpened end of the blade covered and in a second position the fishing reel is received in the handle with the sharpened blade protruding.

4 Claims, 3 Drawing Figures

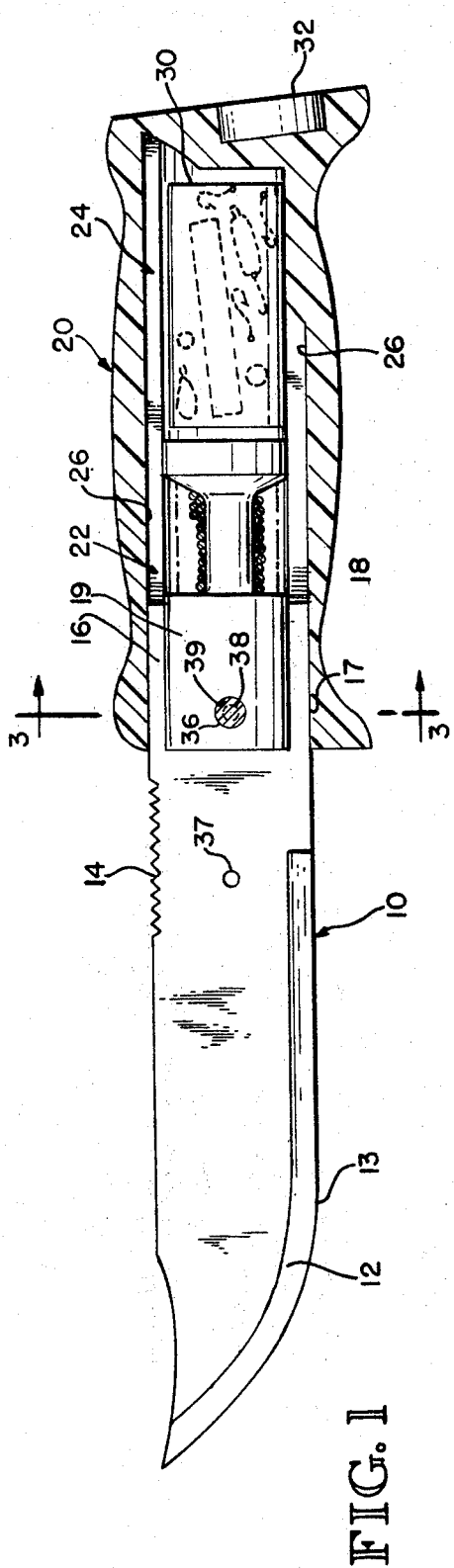
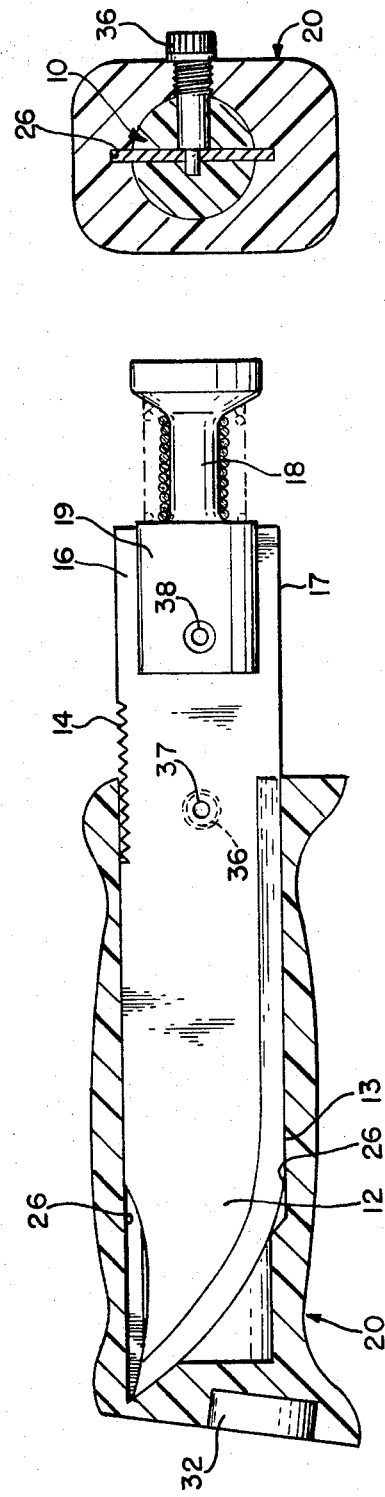
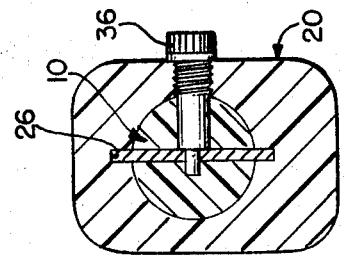

SURVIVAL KNIFE

BACKGROUND OF THE INVENTION

Field of the Invention

This invention pertains to wilderness survival equipment and, more particularly, to a knife having a reversible handle for exposing either a sharpened blade or an attachment end for use with a desired piece of survival gear.

SUMMARY OF THE INVENTION

It is an object of this invention to provide a blade having a sharpened end and an opposite attachment end containing some form of survival gear, preferably a fishing line spool, and a handle selectively positionable into one position for housing the sharpened end of the blade to expose the spool and into another position for exposing the sharpened blade.

It is another object of this invention to provide a knife convertible into a different survival implement.

It is another object of this invention to provide a knife convertible into a fishing implement and having a storage compartment suitable for carrying fishing gear.

BRIEF DESCRIPTION OF THE FIGURES OF THE DRAWINGS

FIG. 1 is a side elevation of a survival knife embodying the principles of the invention with parts broken away for clarity.

FIG. 2 is a side elevation of the survival knife shown in FIG. 1 with the handle in another operative position.

FIG. 3 is a transverse section taken along the line 3—3 of FIG. 1.

DESCRIPTION OF THE PREFERRED EMBODIMENTS

The survival knife includes a blade 10 having a sharpened end 12. The sharpened end is provided with a cutting edge 13 and a serrated cutting edge 14 suitable for fish scaling. The blade 10 also includes an attachment end 16 having flattened edges 17 and a survival implement, such as a fishing line spool 18.

The fishing line spool 18, is preferably of plastic and includes an integrally molded pair of legs 19 secured to the blade. Although the spool is rigid it may also include a rotatable reel or be of any other configuration suitable for handling fishing line.

The knife is provided with a handle 20 having a blade receiving opening 22 and a storage compartment 24. The handle receiving opening 22 is provided with opposed grooves 26 which slidably receive the flat edges 17 of the blade 10 to firmly hold the blade within the handle. The storage compartment 24 suitably houses a container 30 holding fishing gear such as hooks, sinkers or the like and any other suitable survival gear. The closed end of the handle is provided with a compass 32 of any suitable design.

The handle second position is best shown in FIG. 2 in which the sharpened end 12 of the blade 10 is housed within the handle receiving opening 22 and storage compartment 24. In this position the spool 18 is exposed and the sharpened edge 13 and 14 are covered by the handle so that the blade can be safely held. The blade is selectively held in positions shown in FIG. 1 and 2 by a threaded pin 36 which is removably received in the blade in one of two bores 37 or 38. The handle is provided with an enlarged threaded opening 39 for threadably receiving the securing pin 36. As is readily apparent threading the securing pin through the opening 39 into one of the bores 37 or 38 will allow the handle to be secured in one of the two positions shown dependent upon which end of the blade is to be inserted in the handle.

The use of the blade is apparent from the drawings. When the handle is positioned as shown in FIG. 1 the blade and the container 30 are held within the handle 20. In this position the knife is used in a conventional manner. If it becomes necessary or desirable to use the attachment end of the blade the securing pin 36 is removed and the sharpened end of the blade 12 is inserted within the handle receiving and storage compartments of the handle. The securing pin 36 is then inserted into bore 37 to securely attach the handle to the blade with the spool 18 exposed. Upon removal of the handle the container 30 may be removed to obtain the fishing gear.

As is readily apparent the convertible handle feature provides easily carried fishing gear which will always be with the user when carrying the knife. Since a knife is a customary piece of equipment used by the outdoorsman the fishing gear will also be available to him in case of emergency. Of course, the compact nature of the convertible knife also advantageously provides a convenient way of carrying fishing gear for any outing trip and is easily accessible even for non-emergency use.

While the preferred form of the invention has been illustrated and described it should be understood that the invention is not to be limited to the preferred embodiment, but is to be limited only by a literal interpretation of the claims appended hereto.

The embodiment of the invention in which an exclusive property or privilege is claimed are defined as follows:

1. A survival knife comprising a blade having a sharpened end and an attachment end, a removable handle, said removable handle including a blade holding opening for receiving alternatively the sharpened end of the blade or the attachment end and a storage compartment for carrying a container having a plurality of implements useful in wilderness survival, said attachment end including a spool having flanged ends for containing a roll of fishing line, and said implements including fishing gear, means securing the attachment end of the blade in the opening in a first position with the sharpened end protruding for use as a knife, and means for securing the sharpened end of the knife within the opening in a second position with the attachment end protruding.

2. The survival knife of claim 1 said blade holding opening and storage compartment having opposed grooves slightly larger than the thickness of the blade for slidably receiving the blade.

3. The survival knife of claim 1 said handle including a compass housed therein.

4. A survival knife comprising a blade having a sharpened end and an attachment end, a removable handle, said removable handle including a blade holding opening and a storage compartment for carrying a plurality of implements useful in wilderness survival, means securing the attachment end of the blade in the handle in a first position with the sharpened end protruding for use as a knife, and means for securing the sharpened end of the knife within the handle in a second position with the attachment end protruding, said blade holding opening and storage compartment having opposed grooves slightly larger than the thickness of the blade for slidably receiving the blade, said securing means including a transverse threaded bore in the handle and selectively operable spaced bores in the blade selectively alignable with said transverse bore, and a threaded screw for threading through said transverse bore into an aligned bore in the blade.

* * * * *